Figure 1:
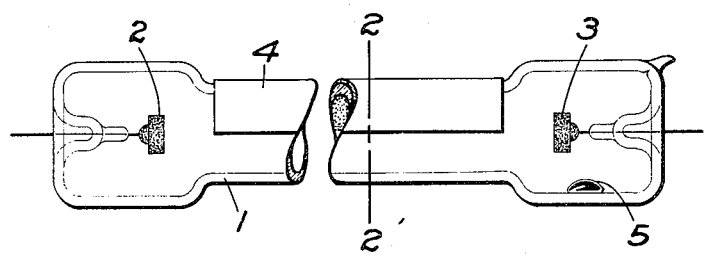

Nov. 8, 1938.   J. T. RANDALL ET AL   2,135,732
DEVICE FOR PRODUCING VISIBLE LIGHT
Filed July 23, 1936

INVENTORS
John Turton Randall
John Walter Ryde
BY Harry E. Dunham
ATTORNEY

Patented Nov. 8, 1938

2,135,732

UNITED STATES PATENT OFFICE 2,135,732

DEVICE FOR PRODUCING VISIBLE LIGHT

John Turton Randall and John Walter Ryde, Middlesex, England, assignors to General Electric Company, a corporation of New York Application July 23, 1936, Serial No. 92,226
In Great Britain July 30, 1935

2 Claims. (Cl. 176—122)

This invention relates to devices for producing visible light of the type comprising means for producing an electric discharge and material adapted to be excited to luminescence by that discharge. Luminescence includes, of course, both phosphorescence and fluorescence, but devices in which the purpose of the luminescent material is to produce phosphorescence only, that is to say, only light enduring after the excitation ceases, are excluded from the invention. Only those devices are included wherein the luminescent radiation emitted during the passage of the discharge is of primary or sole importance.

In these devices one of the chief purposes of associating luminescent materials with an electric discharge is to convert into visible light the invisible portion of the radiation from the discharge. But until recently it was not found possible to increase very greatly the total luminous efficiency of the discharge by associating luminescent materials with it. The object of using luminescent materials was not so much to increase the efficiency of the lamp as to modify the colour of the light by adding to the primary light from the discharge luminescent light of a different colour. In these circumstances it was not always necessary or desirable to secure that the greatest possible amount of luminescent light was emitted in the direction in which light was required.

Recently however advances in the manufacture of luminescent materials and in the manner of attaching them to the interior surface of the envelope of a discharge tube have led to the production of lamps that surpass in efficiency electric incandescent lamps and in which by far the greater portion of the light is luminescent and not primary light. Thus, while the efficiency of incandescent lamps never greatly exceeds 15 lumens/watt, it is possible to produce a combination of a low pressure mercury discharge with zinc silicate as the luminescent material in which the initial efficiency is as great as 80 lumens/watt, although the efficiency of the discharge, without the luminescent material, is only about 5 lumens/watt. In such lamps, since efficiency is their main purpose, it is very important to secure the maximum efficiency, which means the greatest amount of luminescent light from a given discharge. The object of this invention is to obtain this maximum; since it arises mainly or only in connection with these high efficiency lamps, the invention will be limited to such lamps. In what follows lamps of the type specified will mean devices of the type already specified in which (1) the candle-power efficiency, in that direction in which the candle-power is maximum, substantially exceeds 1.2 candle/watt (which, if the distribution were spherical, would be equivalent to 15 lumens/watt), and (2) at least two-thirds of the light in this direction is luminescent light.

It might be thought, and apparently has generally been thought, that, in order to obtain the greatest possible amount of luminescent light, it would be desirable to surround the discharge completely with the luminescent material, so that all the primary light from the discharge falls on the luminescent material and has a chance of being converted into secondary light from it. But this conclusion is not necessarily correct. For if the luminescent material completely surrounds the discharge, that part of the secondary radiation which is emitted towards the source of primary light is absorbed, at least in part, by the luminescent material on the other side of the source. We have found that this absorption is so important that, in some circumstances, increase of some 25% in the candle-power efficiency is obtained if the source is only partially surrounded by the luminescent material; the loss of secondary light due to the failure of some of the primary light to fall on luminescent material is more than compensated by the gain due to absence of absorption.

Thus in a discharge lamp consisting of a tubular glass envelope containing a mixture of mercury and argon through which a low pressure discharge passes and carrying zinc or cadmium silicate on its interior surface, we find it preferable to cover only about one half of the tube with the silicate, so that the coated and bare portions are divided approximately by a plane containing the axis of the tube. This is particularly desirable when the lamp is to illuminate a plane surface; the dividing plane is then arranged parallel to this surface. (Here and elsewhere in the specification zinc silicate means the material (often called willemite) emitting green luminescent light under excitation by the discharge. It does not mean the less well known material emitting yellow luminescent light.)

According to the invention in lamps of the type specified the luminescent material that provides the greater part of the light is confined to a surface which does not substantially surround the electric discharge, so that there is a solid angle, a substantial fraction of $4\pi$, within which the primary light emerges without incidence on the said luminescent material.

The value of this solid angle depends somewhat on the proportion of visible to invisible radiation from the discharge, on the absorption coefficient of the luminescent material for the light it emits, and on the purpose for which the lamp is to be employed. The value $2\pi$ given above for one particular example is not necessarily general. It should be adjusted so that the total amount of light, primary and luminescent emitted in the direction where it can be utilized, is as great as possible for a given discharge and given kind of luminescent material.

In lamps according to the invention it is usually desirable to back the luminescent material by a reflector adapted to direct any luminescent light transmitted through the material so that it emerges within the uncoated solid angle. Thus, in the example above mentioned, the coated half of the tube is covered externally with a layer of silver, when desired. If there is such a reflector, for the purpose of deciding whether the lamp is of the type specified the candle-power of the lamp is to be determined without the reflector.

In some lamps of the type specified there is often present in addition to the luminescent material providing the main part of the light, a small amount of luminescent material of another kind, modifying the colour of the light. Thus zinc silicate excited with a low-pressure mercury discharge may be associated with a small proportion of zinc phosphate and/or calcium tungstate. In such cases it may not be desirable to distribute the two luminescent materials in the same way; thus the zinc phosphate and/or calcium tungstate may be distributed uniformly round the discharge, or this material may be restricted to that part of the inner surface of the container not coated with the luminescent material providing the main part of the light, since its quantity is too small to produce any considerable absorption. Accordingly, in the foregoing statement of the invention, and in the appended claims, the luminescent material that provides the greater part of the light must be interpreted strictly and not held to include luminescent material, additional to the said material, which provides only light relatively unimportant in quantity, although it may be important in quality.

Figure 2:
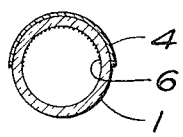
Figure 3:
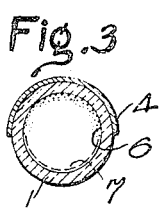

In the drawing accompanying and forming part of this specification an embodiment of the invention is shown, in which Fig. 1 is a side elevational view of a gaseous electric discharge device embodying the invention, Fig. 2 is a sectional view along the line 2—2 of Fig. 1, and Fig. 3 is a similar view of another embodiment of the invention.

Like numbers denote like parts in all the figures.

Referring to Figs. 1 and 2 of the drawing the gaseous electric discharge device comprises a tubular container 1 having carbon electrodes 2 and 3 sealed therein at each end thereof and a quantity of vaporizable material 5 therein the vapor of which emits visible and ultra-violet rays when excited by the passage of an electric discharge therethrough. Said container 1 also has a starting gas therein, such as argon at a pressure of approximately 1 to 10 mm.

Said container 1 has a coating 6 of fluorescent material, such as cadmium silicate, on the inner surface thereof which coating is applied to only approximately one half of the container 1 so that the coated and uncoated portions of the inner surface are divided by a plane passing through the longitudinal axis of the tubular container 1. A reflecting coating 4, such as a silver coating, is applied to the outer surface of said container 1 and is coextensive with the coating 6 on the inner surface of said container 1 to direct any visible light transmitted by the fluorescent material and the gaseous electric discharge through the uncoated portion of the container 1.

The coating 6 is applied to inner surface of said container 1 by methods now known in the art, such as by applying a volatilizable binder, such as a mixture of alcohol and glycerine, to the portion of the container 1 to be coated, evenly distributing, as by flowing or dusting, particles of the fluorescent material on the binding material and then volatilizing the binding material, as by heating. The reflecting coating 4 is applied to the outer surface of the container 1 by methods now known in the art, as by electro-deposition. The embodiment of the invention illustrated in Fig. 3 of the drawing is similar in all respects to that shown in Figs. 1 and 2 except that in this embodiment another coating 7 of a small amount of a different fluorescent material, such as calcium tungstate, is applied to that part of the inner surface of the container 1 not having coating 6 thereon. When desired, coating 7 is uniformly distributed around the discharge and coating 6 is restricted to a portion of the container 1, as pointed out above.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, other types of electrodes, such as sheet metal electrodes, or thermionic electrodes, are used in place of the carbon electrodes 2 and 3, when desired.

What we claim as new and desire to secure by Letters Patent of the United States, is:—

1. A gaseous electric discharge device comprising a container, electrodes sealed therein, a gaseous atmosphere therein, a comparatively thick coating of fluorescent material on part of the inner surface of said container and a comparatively thin coating of a different fluorescent material on the other part of said inner surface, said thick fluorescent coating being restricted in area to present the absorption by said thick coating of the light emitted thereby.

2. A gaseous electric discharge device comprising a container, electrodes sealed therein, a gaseous atmosphere therein, a comparatively thin coating of fluorescent material uniformly distributed on the inner surface of said container and a comparatively thick coating of a different fluorescent material on a part of said inner surface, said thick fluorescent coating being restricted in area to prevent the absorption by said thick coating of the light emitted thereby.

JOHN TURTON RANDALL.
JOHN WALTER RYDE.

CERTIFICATE OF CORRECTION.

Patent No. 2,135,732.                                November 8, 1938.

JOHN TURTON RANDALL, ET AL.

It is hereby certified that error appears in the printed specification of the above numbered patent requiring correction as follows: Page 2, second column, line 59, claim 1, for the word "present" read prevent; and that the said Letters Patent should be read with this correction therein that the same may conform to the record of the case in the Patent Office.

Signed and sealed this 10th day of January, A. D. 1939.

Henry Van Arsdale (Seal)                                      Acting Commissioner of Patents.